US006563923B2

(12) United States Patent
Otsuka (10) Patent No.: US 6,563,923 B2
(45) Date of Patent: *May 13, 2003

(54) PORTABLE TELEPHONE AND CHARACTER INPUT METHOD

(75) Inventor: Katsuhiro Otsuka, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/449,130

(22) Filed: Nov. 24, 1999

(65) Prior Publication Data

US 2003/0063739 A1 Apr. 3, 2003

(30) Foreign Application Priority Data

Nov. 24, 1998 (JP) .......................... 10-333181

(51) Int. Cl.⁷ .................... H04M 1/00; H03K 17/94
(52) U.S. Cl. .................. 379/368; 379/433.07; 341/22
(58) Field of Search ............... 200/5 A, 6 A, 200/159 B; 341/22, 26; 379/359, 433.06, 433.07, 368, 369

(56) References Cited

U.S. PATENT DOCUMENTS

| | | | | |
|---|---|---|---|---|
| 4,029,915 A | * | 6/1977 | Ojima | ........................ 200/5 A |
| 5,528,235 A | * | 6/1996 | Lin et al. | ........................ 341/22 |
| 5,715,311 A | * | 2/1998 | Sudo | ........................... 379/368 |
| 5,861,823 A | * | 1/1999 | Strauch | ........................ 341/22 |
| 6,275,216 B1 | * | 8/2001 | Kitamura | .................... 345/171 |

FOREIGN PATENT DOCUMENTS

| | | |
|---|---|---|
| EP | 0 540 147 A2 | 5/1993 |
| JP | 63-294633 | 12/1988 |
| JP | 63-304311 | 12/1988 |
| JP | H01-116722 | 5/1989 |
| JP | 07-042252 | 7/1995 |
| JP | 10-12097 | 1/1998 |
| WO | 97/04472 | 2/1997 |

* cited by examiner

*Primary Examiner*—Jack Chiang
*Assistant Examiner*—Rasha S AL-Aubaidi
(74) *Attorney, Agent, or Firm*—Scully, Scott, Murphy & Presser (57) ABSTRACT

A portable telephone having a ten-key pad that allows input of a plurality of kinds of characters is disclosed. Each of the keys of the ten-key pad has a plurality of contact points having a corresponding position with respect to the key, at least one of the contact points being selected depending on which position of the key is pressed, another position of the key being determined by pressing all of the contact points simultaneously. Each key preferably has five positions. A table correlates each position of the key and an individual character of a selected type of characters. Input of an individual character depends on a pressed position of the key correlated by the table to a pressed key of the ten-key pad.

7 Claims, 9 Drawing Sheets

JAPANESE (KATAKANA) INPUT MODE

|   | PRESSED POSITION① | PRESSED POSITION② | PRESSED POSITION③ | PRESSED POSITION④ | PRESSED POSITION⑤ |
|---|---|---|---|---|---|
| 1KEY | ア、ァ "a" | イ、ィ "i" | ウ、ゥ "u" | エ、ェ "e" | オ、ォ "o" |
| 2KEY | カ、 "ka" | キ、 "ki" | ク、 "ku" | ケ、 "ke" | コ、 "ko" |
| 3KEY | サ、 "sa" | シ、 "si" | ス、 "su" | セ、 "se" | ソ、 "so" |
| 4KEY | タ、 "ta" | チ、 "ti" | ツ、ッ "tu" | テ、 "te" | ト、 "to" |
| 5KEY | ナ、 "na" | ニ、 "ni" | ヌ、 "nu" | ネ、 "ne" | ノ、 "no" |
| 6KEY | ハ、 "ha" | ヒ、 "hi" | フ、 "hu" | ヘ、 "he" | ホ、 "ho" |
| 7KEY | マ、 "ma" | ミ、 "mi" | ム、 "mu" | メ、 "me" | モ、 "mo" |
| 8KEY | ヤ、ャ "ya" |  | ユ、ュ "yu" |  | ヨ、ョ "yo" |
| 9KEY | ラ、 "ra" | リ、 "ri" | ル、 "ru" | レ、 "re" | ロ、 "ro" |
| 0KEY | ワ、 "wa" | ヲ、 "wo" | ン、 "n" | "ー" | ・!? |
| *KEY | CURSOR (LEFT) | CURSOR (LEFT) | CURSOR (LEFT) | CURSOR (LEFT) | CURSOR (LEFT) |
| #KEY | CURSOR (RIGHT) | CURSOR (RIGHT) | CURSOR (RIGHT) | CURSOR (RIGHT) | CURSOR (RIGHT) |

ALPHABETIC INPUT MODE

| | PRESSED POSITION① | PRESSED POSITION② | PRESSED POSITION③ | PRESSED POSITION④ | PRESSED POSITION⑤ |
|---|---|---|---|---|---|
| 1KEY | | | | | |
| 2KEY | B, b | | C, c | | A, a |
| 3KEY | E, e | | F, f | | D, d |
| 4KEY | H, h | | I, i | | G, g |
| 5KEY | K, k | | L, l | | J, j |
| 6KEY | N, n | | O, o | | M, m |
| 7KEY | R, r | P, p | S, s | | Q, q |
| 8KEY | U, u | | V, v | | T, t |
| 9KEY | Y, y | W, w | Z, z | | X, x |
| 0KEY | : & | . | ) | - | ( |
| *KEY | CURSOR (LEFT) | CURSOR (LEFT) | CURSOR (LEFT) | CURSOR (LEFT) | CURSOR (LEFT) |
| #KEY | CURSOR (RIGHT) | CURSOR (RIGHT) | CURSOR (RIGHT) | CURSOR (RIGHT) | CURSOR (RIGHT) |

NUMERAL INPUT MODE

| | PRESSED POSITION ① | PRESSED POSITION ② | PRESSED POSITION ③ | PRESSED POSITION ④ | PRESSED POSITION ⑤ |
|---|---|---|---|---|---|
| 1KEY | 1 | 1 | 1 | 1 | 1 |
| 2KEY | 2 | 2 | 2 | 2 | 2 |
| 3KEY | 3 | 3 | 3 | 3 | 3 |
| 4KEY | 4 | 4 | 4 | 4 | 4 |
| 5KEY | 5 | 5 | 5 | 5 | 5 |
| 6KEY | 6 | 6 | 6 | 6 | 6 |
| 7KEY | 7 | 7 | 7 | 7 | 7 |
| 8KEY | 8 | 8 | 8 | 8 | 8 |
| 9KEY | 9 | 9 | 9 | 9 | 9 |
| 0KEY | 10 | 0 | 0 | 0 | 0 |
| *KEY | * | * | * | * | * |
| #KEY | # | # | # | # | # |

PORTABLE TELEPHONE AND CHARACTER INPUT METHOD

BACKGROUND OF THE INVENTION

1. Field of the invention

The present invention relates to a portable telephone having a ten-key pad for inputting a plurality of kinds of characters, for example, numerical, alphabetic and/or Japanese characters, and in particular to a character input method using the ten-key pad for inputting characters to the portable telephone.

2. Description of Related Art

Recently, portable phones with a smaller size and a lighter weight have been widespread. Many of such portable phones, that is, portable-type communication devices can store telephone numbers and other necessary information in the internal memory. In the case of storing a telephone number, not only the telephone number but also characters of the name associated with the telephone number must be inputted.

Figure 9:
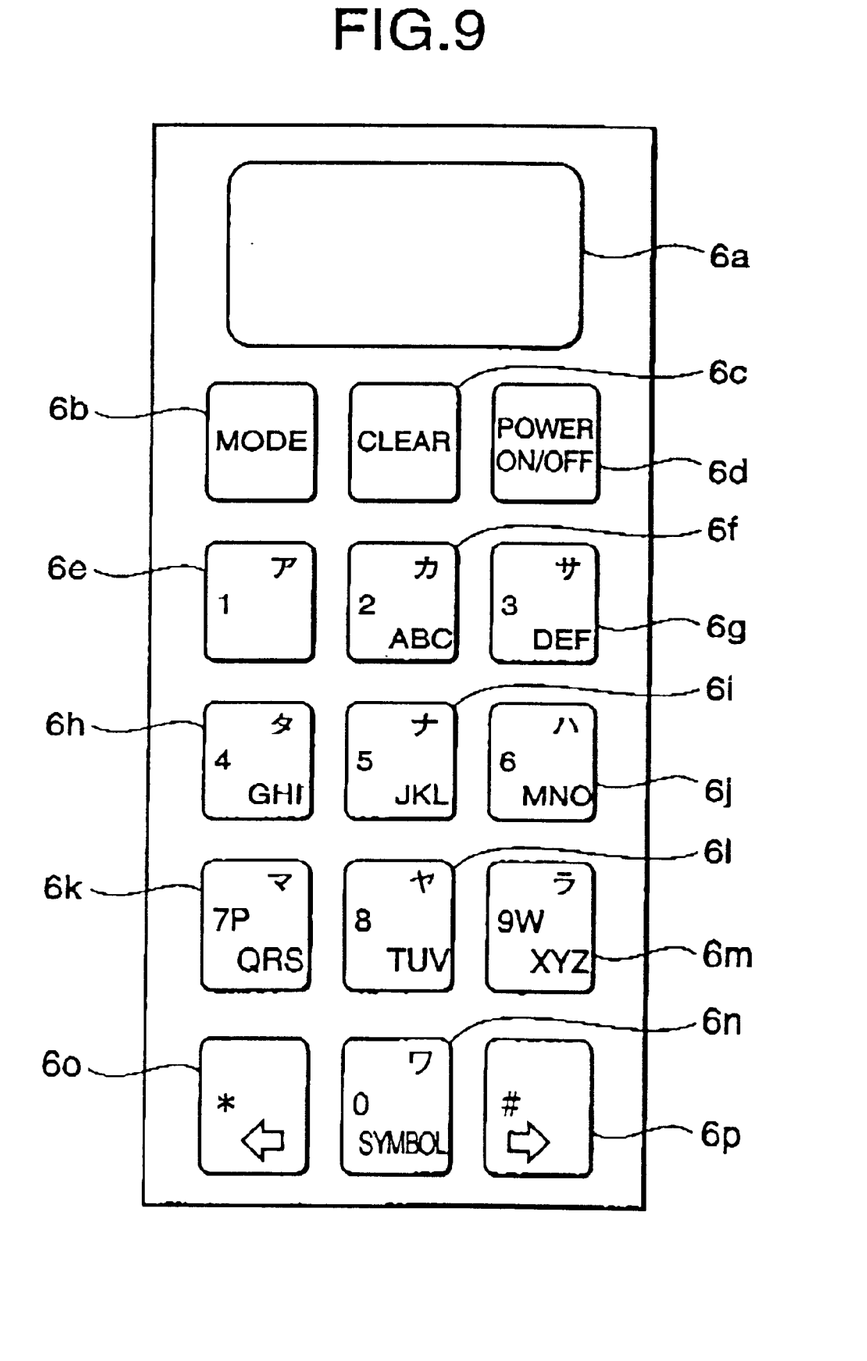

Therefore, in a conventional portable phone, as shown in the external appearance view of FIG. 9, ten keys for inputting telephone numbers and other data are used also for inputting numbers, alphabetic characters and/or Japanese characters. The respective input modes of numbers, Alphabetic and the Japanese characters can be switched by pressing a mode key 6b. A key input system of inputting a targeted number, alphabetic character or Japanese character by pressing one of the ten keys is adopted in general.

The number of alphabets and Japanese characters is larger than the number of numerals. Therefore, a plurality of alphabetic characters and Japanese characters are allotted to each of the ten keys. Furthermore, each character corresponds to the number of times a corresponding one of the ten keys is pressed. Consequently, in the conventional portable phone, a targeted character is selected among the plurality of the characters allotted to the ten key according to the number of key pressing repetitions.

As an example of the character input, the case of inputting "S" will be explained.

First, the alphabetic character input mode is selected by pressing the mode key 6b. The characters in the "P" column, to which "S" belongs, are allotted to the 7-key 6k. The targeted character "S" corresponds to the case of pressing the 7-key 6k four times. Then, when the 7-key is pressed four times, alphabetic characters "P", "Q", "R", and "S" are indicated successively on a display 6a so that "S" at the fourth time is inputted.

As mentioned above, in selecting and inputting a character in a portable phone, in general, there is the need of pressing the ten keys for many times. Therefore, a problem is involved in that the character inputting operation requires labor and time.

Japanese Patent Laid Open Publication (JP-A) No. 63-304311 discloses a handy word processor provided with a key switch enabling input of four kinds of characters through a single key by the operation of inclining the key forward, backward, leftward and rightward. According to this conventional technology, the key pad can be made smaller by reduction of the number of keys.

However, the JP-A No. 63-304311 includes no description about inputting characters rapidly by using the ten keys in a portable phone, but it merely discloses the technology for reducing the number of keys in a word processor. Besides, characters corresponding to each key switch are arbitrarily determined in the word processor.

In contrast, portable phones with Japanese characters allotted to each ten key have already been used widely. Therefore, it is not preferable to change the conventional character allotment in each ten-key since it would cause inconvenience to the users who are used to using the portable phones.

Besides, conventionally, five characters in each column of the Japanese fifty-sound syllabary are allotted to each ten-key. For example, the five characters of "a", "i", "u", "e" and "o" are, in general, allotted to the ten-key of "1".

However, the maximum number of contact points corresponding to one key switch is considered to be four. That is, in the case five or more contact points correspond to one key switch, it is difficult to distinguish the way of inclining the key switch, and thus generation of frequent input mistakes is anticipated. Therefore, it is difficult to rapidly input characters by merely inclining key switches without changing the characters allotted to each ten key.

SUMMARY OF THE INVENTION

An object of the present invention is to provide a portable telephone and a character input method, which are capable of inputting characters rapidly without changing the characters conventionally allotted to the ten-keys.

According to the present invention, a portable telephone having a ten-key pad which allows input of a plurality of kinds of characters. Includes each of keys of the ten-key pad having a plurality of contact points, at least one of which is selected depending on which position of the key is pressed; a table for each of the kinds of characters, the table containing correspondence between each position of the key and an individual character of a selected type of characters; and a controller controlling input of an individual character of the selected type of characters depending on a pressed position of the key by referring to the table. The controller determines an individual character of the selected type of characters depending on a combination of a pressed key of the ten-key pad and a pressed position of the pressed key. Each key of the ten-key pad preferably has five positions, one of which selecting all the contact points of the key.

Further preferably, the controller determines an individual character of the selected type of characters depending on a combination of a pressed key of the ten-key pad and a pressing count of a pressed position of the pressed key. More preferably, the pressed position is pressed once, a uppercase letter of the individual character is determined and, when the pressed position is pressed twice in a predetermined time period, a lower-case letter of the individual character is determined.

As mentioned above, according to the present invention, a character corresponds to a contact point individually so that the character corresponding to the contact point is inputted by pressing the corresponding position of the key. Therefore, in principle, a targeted character can be selected and inputted easily by pressing a key top once.

Besides, since all the contact points correspond to a character also in the case where all the contact points are selected at the same time, the number of characters larger than that of the contact points can be allotted to one ten-key. In other words, a targeted character can be selected from characters of the number larger than the number of the contact points by by pressing one ten-key once. As a result, characters can be inputted rapidly.

Further, according to the present invention, it is preferable that when the same position is pressed twice in a certain time period in the Japanese character input mode, a small character representing a double consonant or a contracted sound of the character corresponding to the contact point is inputted. As mentioned above, by pressing the corresponding position of a key twice, a small character representing a double consonant or a contracted sound can be inputted easily. Moreover, the number of the characters of a double consonant and a contracted sound is, in general, relatively small in the number of the characters to be inputted. Therefore, even if the key is pressed twice for a double consonant and a contracted sound, the input rapidity of the Japanese characters is not ruined substantially.

Furthermore, according to the present invention, it is preferable that when the same position is pressed once in a certain time period in the alphabetic character input mode, a uppercase alphabetic letter corresponding to the contact point is inputted, and when the same position is pressed twice in the certain time period, a lower-case alphabetic letter corresponding to the contact point is inputted.

As mentioned above, by switching the uppercase and lower-case alphabetic letters depending on a pressing count, input of the uppercase and lower-case letters can be switched easily. Moreover, since a targeted alphabetic letter can be selected by pressing twice at most, the alphabetic characters can be inputted rapidly.

It is preferable that four contact points are provided in each key. By providing four contact points, five characters can be selected in one key including the case of selecting all the contact points at the same time As a result, characters can be inputted rapidly without changing the characters allotted in each ten key in the conventional portable phones.

It is preferable that each of the ten-keys corresponds to a column of the Japanese fifty-sound syllabary. Therefore, the input key for a targeted Japanese character can be found easily so as to be inputted rapidly based on the principle of the Japanese syllabary without changing the characters allotted to the ten keys of the conventional portable phones.

DETAILED DESCRIPTION OF THE PREFERRED EMBODIMENTS

Figure 3:
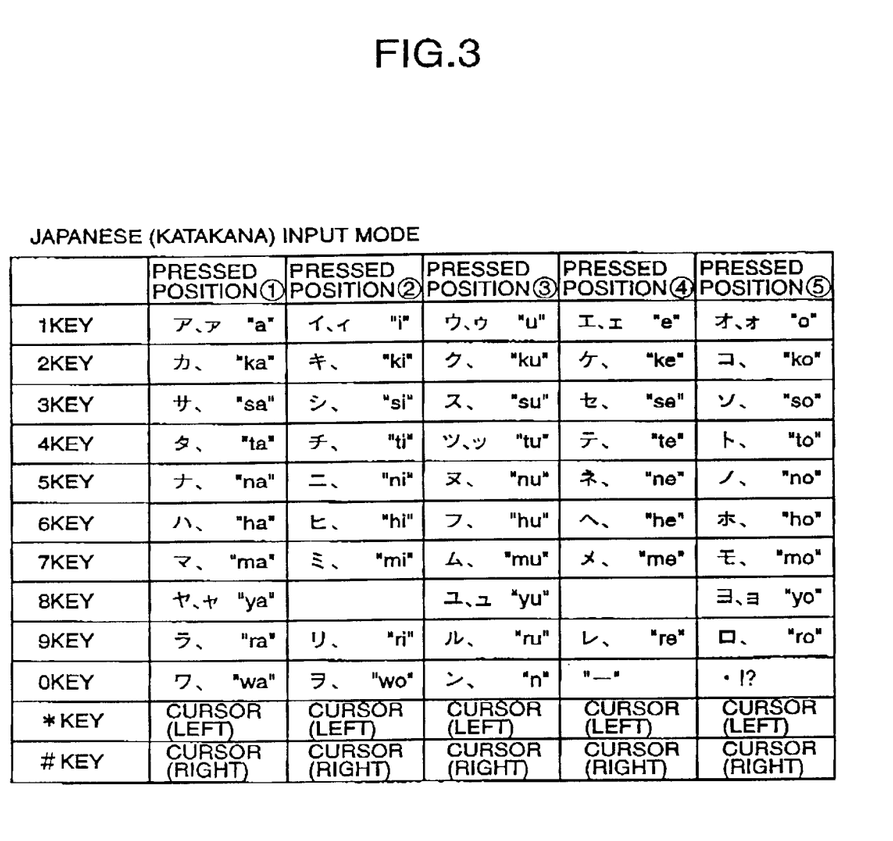
FIG. 3 is a diagram showing a correspondence table of each, contact of each ten-key and characters in the Japanese character input mode (Katakana input mode)
Figure 5:
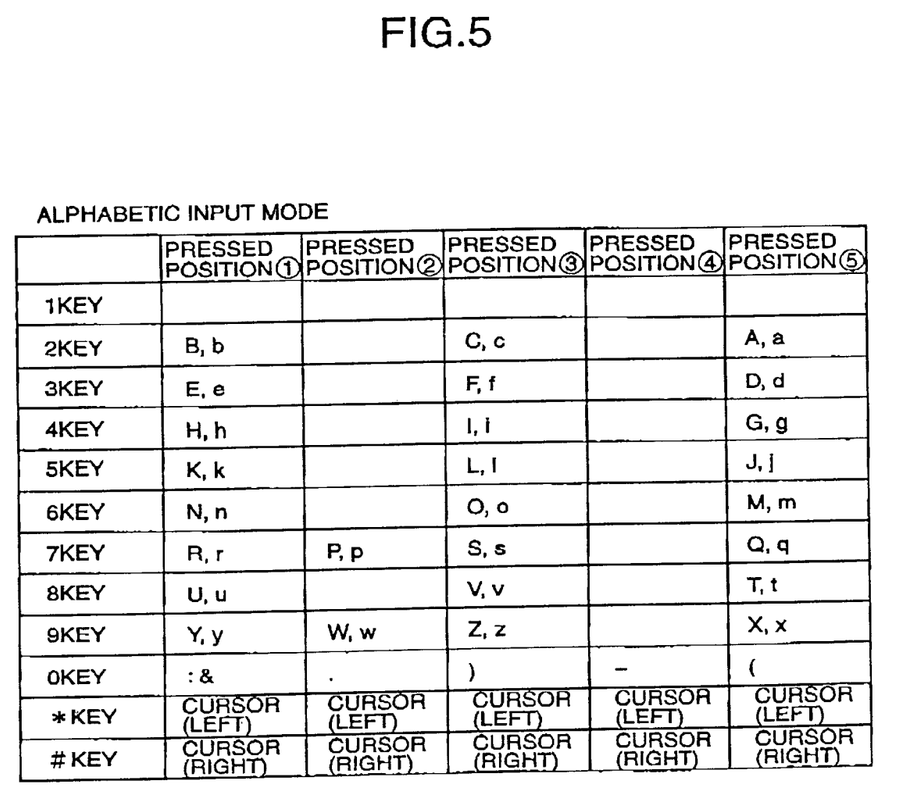
FIG. 5 is a diagram showing a correspondence table of each contact of each ten-key and characters in the alphabetic character input mode.
Figure 7:
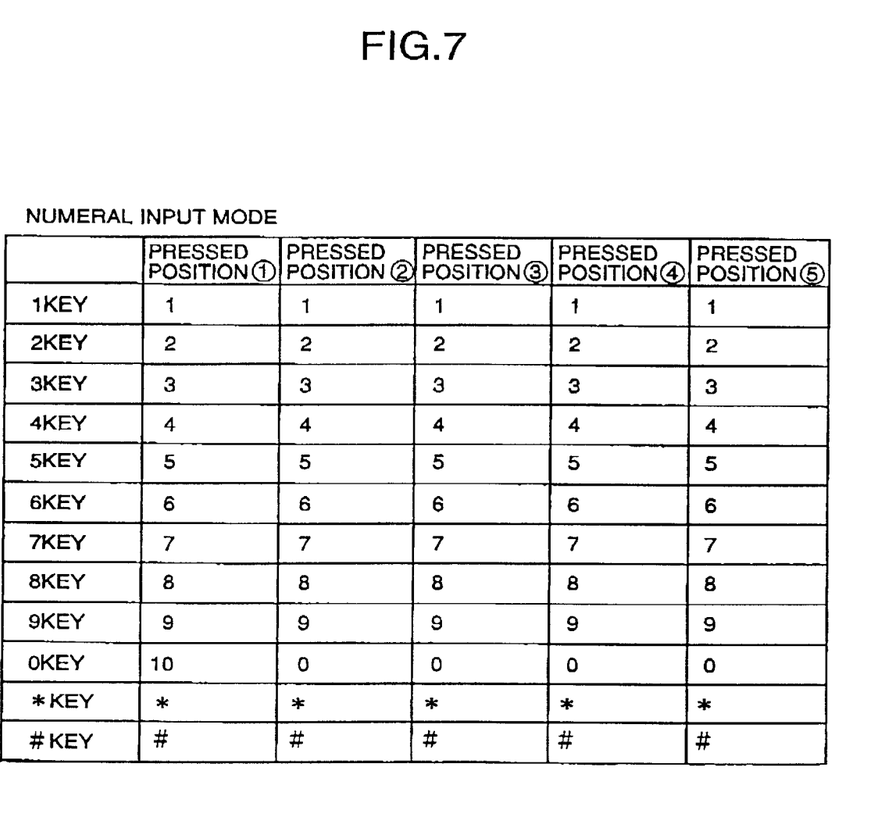
FIG. 7 is a diagram showing a correspondence table of each contact of each ten-key and a numeral in the numeric character input mode.

A portable telephone according to the present invention is provided with a ten-key pad as shown in FIG. 9 and an electronic circuit (not shown) incorporated therein. The electronic circuit includes a.memory storing three correspondence tables as shown in FIGS. 3, 5, and 7 and a controller controlling the operations of the portable telephone including a key input control. First, the configuration of each key of the ten-key pads will be explained.

Figure 1:
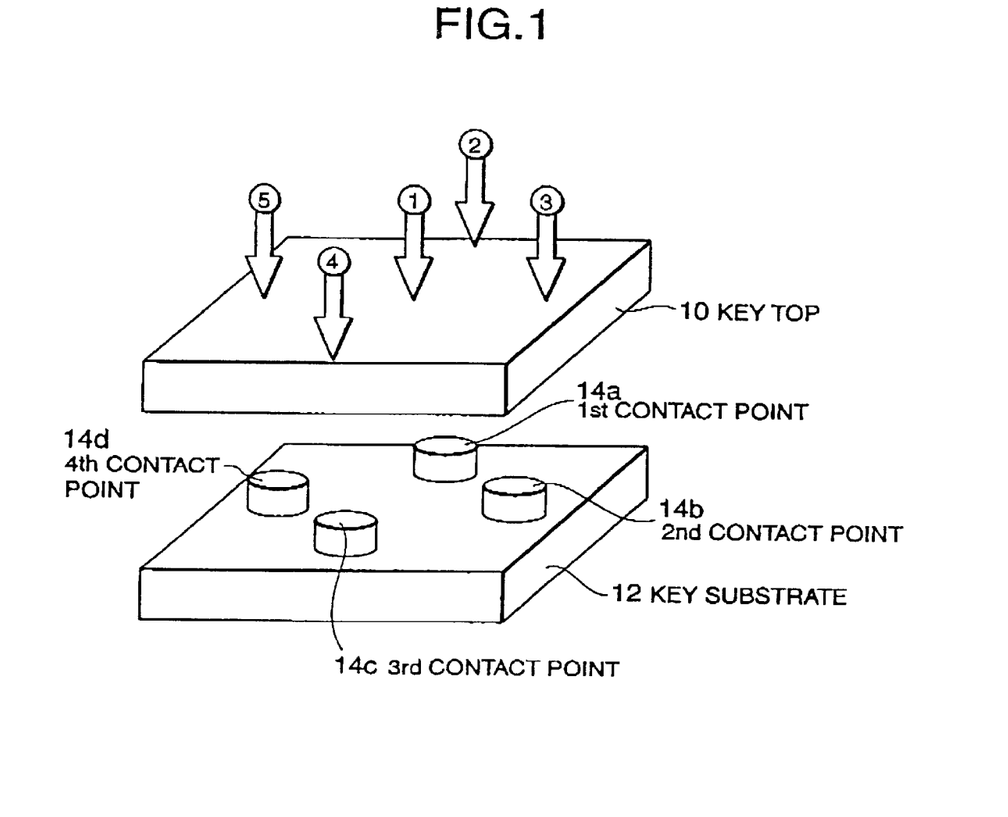
FIG. 1 is a schematic diagram showing the switch structure of one of the ten-keys.

As shown in FIG. 1, a ten-key switch is composed of a key top 10, a key substrate 12, and four contact points 14a to 14d which are provided on each side in the peripheral portion of the key substrate 12. Any contact point among the four contact points can be contacted depending on which one of the pressing positions ① to ⑤ is pressed on the key top 10.

The key top 10 is supported by a spring, a cushion, or the like (not illustrated) similar to the case of the conventional ten-key. However, the key top 10 can be pressed not only in the vertical direction but also in the inclined state. The concrete structure of the ten-key can be conventionally known. For example, the structure of the control key disclosed in JP-A No. 10-012097 can be adopted.

When a position of a key is pressed, the corresponding contact point is switched on, which causes the controller to determine which position of the key is pressed.

Figure 2:
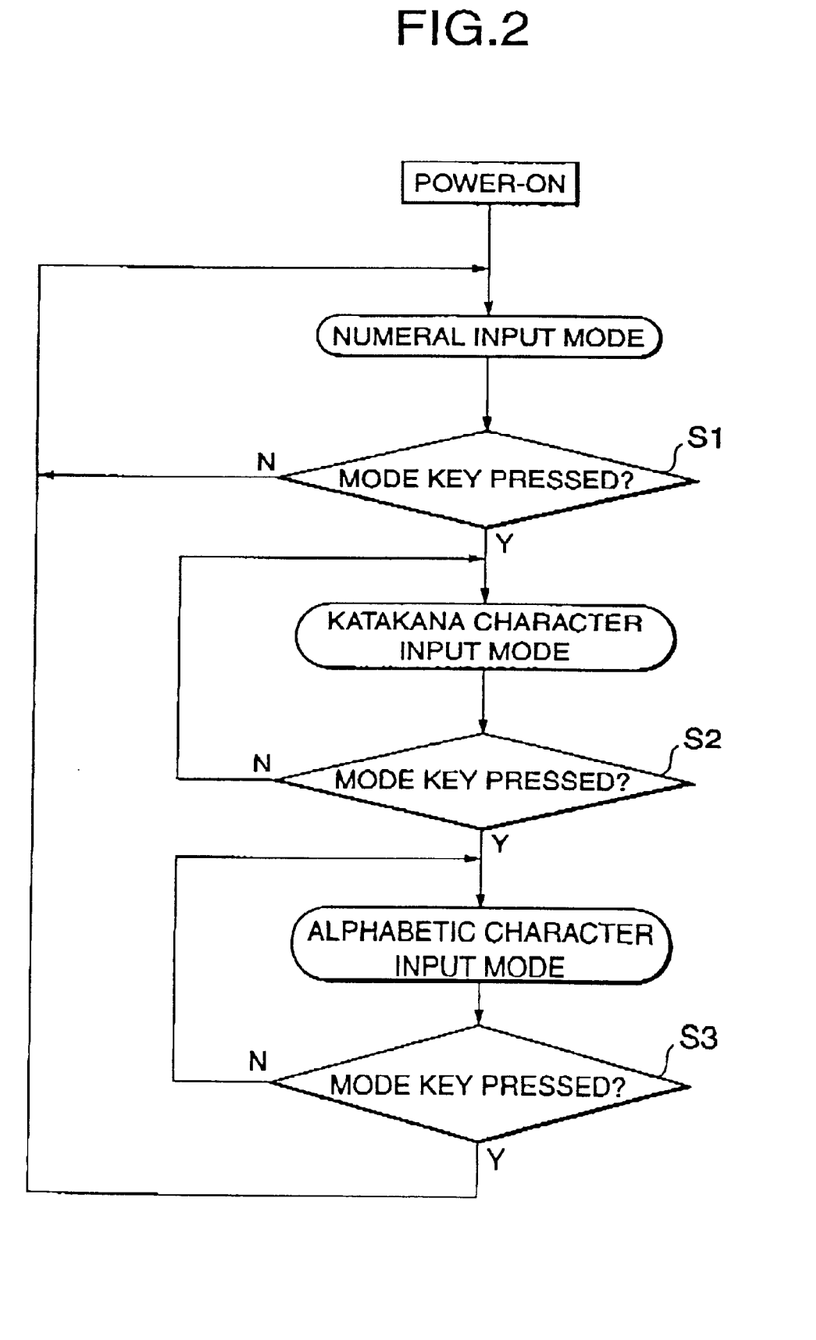
FIG. 2 is a flow chart showing a mode switching operation.

As shown in FIG. 2, when the portable phone is powered on, the controller sets an input mode to the numeric character input mode. Then, when the mode key 6b as shown in FIG. 9 is pressed once (step S1), it is switched to the Japanese character input mode (Katakana input mode). Furthermore, if the mode key 6b is pressed once more (step S2), it is switched to the alphabetic character input mode. Furthermore, if the mode key 6b is pressed once more (step S3), it is again switched to the numeric character input mode. Hereafter, the input mode is switched successively whenever the mode key 6b is pressed. In the case where the Japanese characters are inputted, the mode key 6b is pressed twice so as to select the Japanese character input mode.

FIRST EMBODIMENT

In a first embodiment of the present invention, an input method of Japanese characters (herein, Katakana) will be explained.

As shown in FIG. 3, in the portable phone according to the first-embodiment, the ten-keys correspond to a column of the Japanese syllabary, respectively. The case of contacting with each contact point or all the contact points of each ten key corresponds to a Japanese character on each row of the column of the Japanese syllabary. For example, the 2-key 6f as shown in FIG. 9 corresponds to Katakana in "ka" column, that is, the second column of the Japanese syllabary. Furthermore, the case of contacting with all the contact points in the 2-key 6f and contacting with each contact point 14a to 14d correspond to the characters "ka" to "ko" on each row of the "ka" column.

For example, in the case where the central portion of the 2-key 6f indicated by ① in FIG. 1 is pressed, all the first to fourth contact points 14a to 14d are contacted at the same time. As shown in FIG. 3, the case where ① is pressed among the key top of the 2-key 6f corresponds to "ka".

Judgment of the pressing position is made in this embodiment such that in the case all the contact points 14a to 14d are contacted at the same time for a certain time period or more (for example, 0.2 second or more), ① is judged to be pressed. Moreover, in the case where one contact point is contacted, when other contact points are not contacted for a certain time or more (for example, 0.2 second or more), the position corresponding to the contact point is judged to be pressed. Concretely, in the case where the ② position of the ten key is pressed so as to contact with the first contact point 14a without contacting with another contact point for a certain time or more, ② is judged to be pressed. The same is applied to the other cases of pressing ③ to ⑤.

The key top and the contact points can be contacted electrically or merely physically. In the case of the physical contact, for example, the contact points can be provided as a push button switch with the function of converting the physical contact into an electric signal.

Further, in the correspondence table of FIG. 3, the case of describing two Katakana characters or the like in one section corresponds to the cases of pressing once and twice from the left end. For example, the position shown by ③ of the key top of the 4-key 6h is pressed twice within a certain time period (for example, 0.2 second or less), the second contact point 14b of the 4-key 6h is contacted twice within the certain time period. This case corresponds to a small letter "tu" representing the double consonant. Furthermore for example, the case of contacting the position shown by ⑤ of the key top of the 8-key 6l twice within a certain time period corresponds to a small letter "yo" representing the contracted sound.

Figure 4:
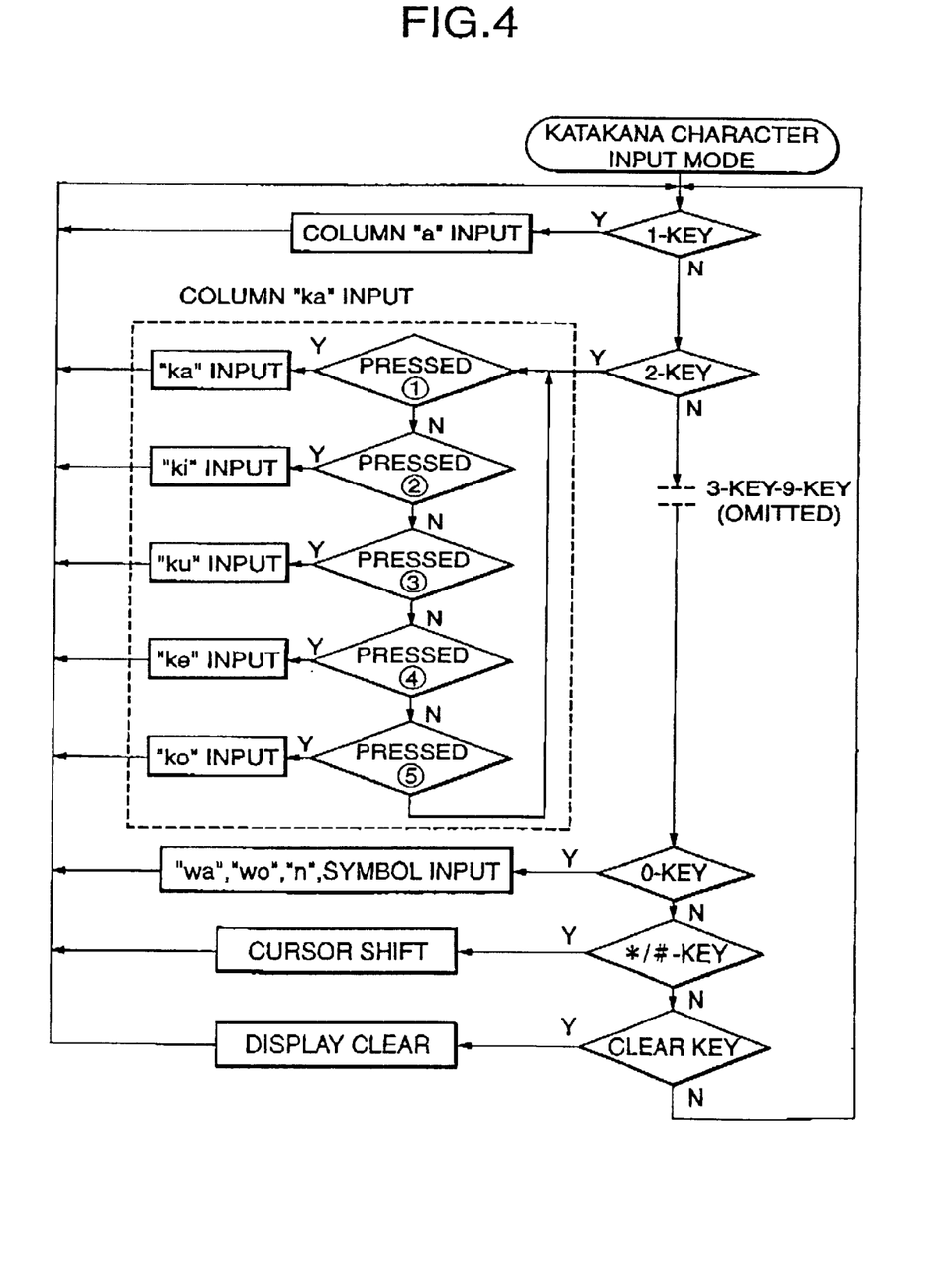
FIG. 4 is a flow chart showing a method for inputting characters in the Japanese character input mode.

As shown in FIG. 4, in the Japanese character input mode (Katakana character input mode), the controller controls such that a targeted character can be displayed by pressing a corresponding position of a corresponding ten-key referring to the correspondence table. In FIG. 4, the character input flow for "ka" column is shown in detail. It will be appreciated that it is the same with the other characters and therefore the character input flows are omitted in FIG. 4.

For example, since the 2-key 6f corresponds to Katakana in "ka" column, when the central portion of the 2-key 6f indicated by ① is pressed, all the first to fourth contact points 14a to 14d are contacted at the same time. Therefore, as shown in FIG. 3, a character "ka" is displayed on the display 6a and the character data is input in the portable phone. As another example, in the case the ④ position of the 2-key is pressed, a character "ke" corresponding thereto is indicated in the display 6a and is input in the portable phone. Moreover, for example, in the case of inputting "mo", the ⑤ position of the 7-key 6k is pressed Just once. Therefore, compared with the conventional case of pressing a ten-key five times for inputting "mo", a desired character can be inputted rapidly.

In the case where a wrong character is inputted, by moving the cursor through cursor shift keys 6o or 6p on the display 6a and pressing a clear key 6c, the character highlighted by the cursor can be erased.

SECOND EMBODIMENT

In a second embodiment, an operation of inputting alphabetic characters will be explained.

As shown in FIG. 5, in the portable phone according to the second embodiment, each contact point corresponds to different alphabetic characters. For example, the case of pressing ① of the 2-key 6f corresponds to "B" and "b" and the case of pressing ⑤ of the 4-key 6h corresponds to "G" and "g" as shown in FIG. 5.

In the correspondence table of FIG. 5, capital and lowercase letters for each section are selectively input depending on how many times the same contact point is pressed. In the case where the same contact point of a certain key is pressed once for a certain time period, the uppercase letter of the corresponding alphabetic character is input. On the other hand in the case where the same contact point is pressed twice, the lower-case letter of the alphabetic character is input. For example, the position shown by ③ of the 4-key 6h is pressed once within a certain time period (for example, 0.2 second or less), the second contact point 14b of the 4-key 6h is contacted once. This case corresponds to the capital alphabetic character "I". In contrast, the case the same position is pressed twice within the certain time period corresponds to the small alphabetic character "i".

As shown in FIG. 5, each pressing position of the 1-key and the pressing positions ② and ④ of the 2-key to 6-key and 8-key have a blank field. An desired character can be filled in the blank.

Figure 6:
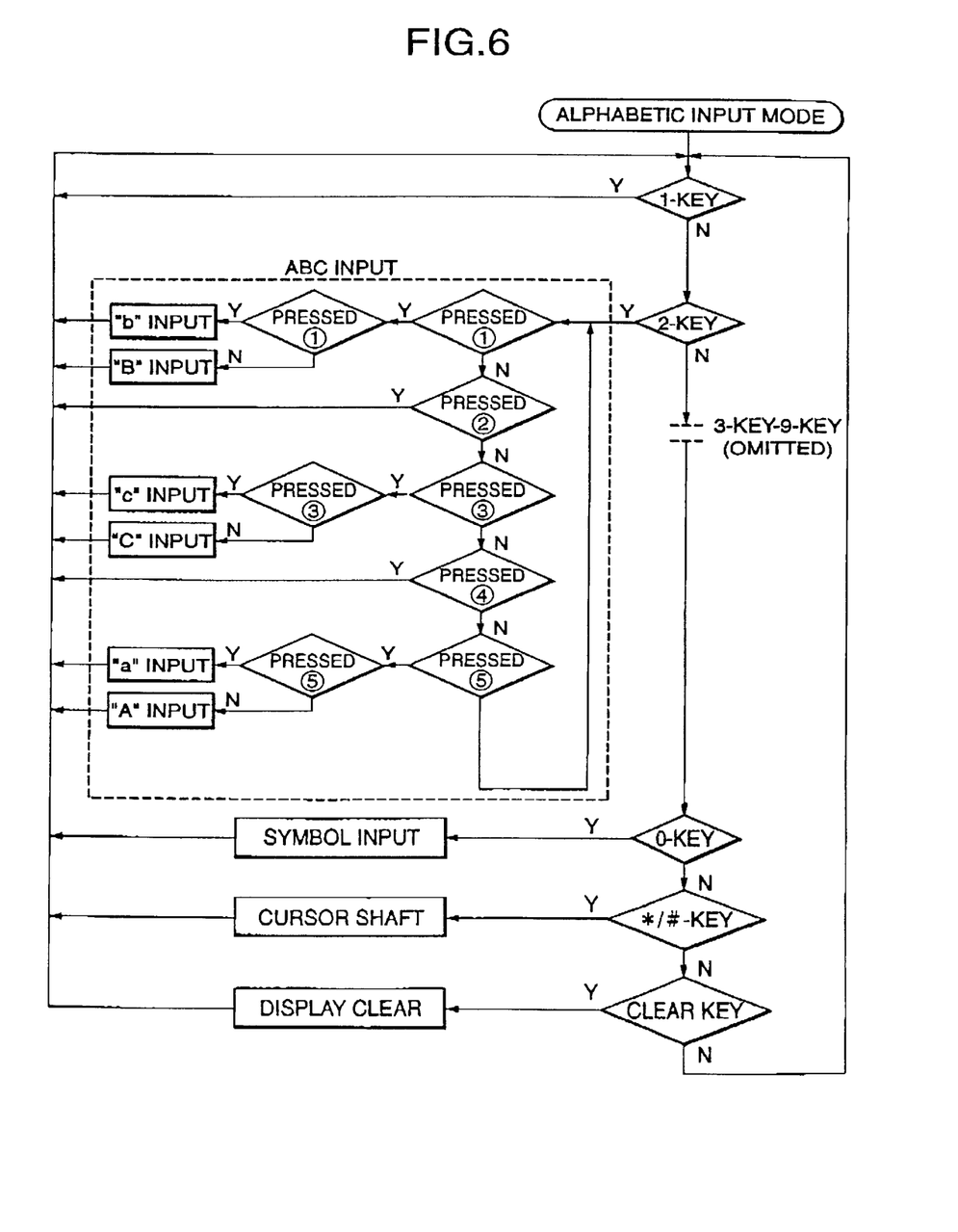
FIG. 6 is a flow chart showing a method for inputting characters in the alphabetic character input mode.

As shown in FIG. 6, in the alphabetic character input mode, the controller controls such that a targeted alphabetic character can be displayed and input by pressing a corresponding position of a corresponding ten-key once or twice referring to the correspondence table. In FIG. 6, the character input flow for "ABC" column is shown in detail. It will be appreciated that it is the same with the other characters and therefore the character input flows are omitted in FIG. 5.

For example, in the case the ⑤ position of the key top of the 2-key is pressed once, the uppercase letter "A" corresponding thereto is inputted. Moreover. In the case the same position ⑤ is pressed twice, the lower-case letter "a" corresponding thereto is inputted. It is the same with the other characters B and C.

THIRD EMBODIMENT

In a third embodiment, an operation of inputting numerals will be explained. The method for inputting numeric characters is the same as that for inputting a telephone number in a conventional portable phone.

Figure 8:
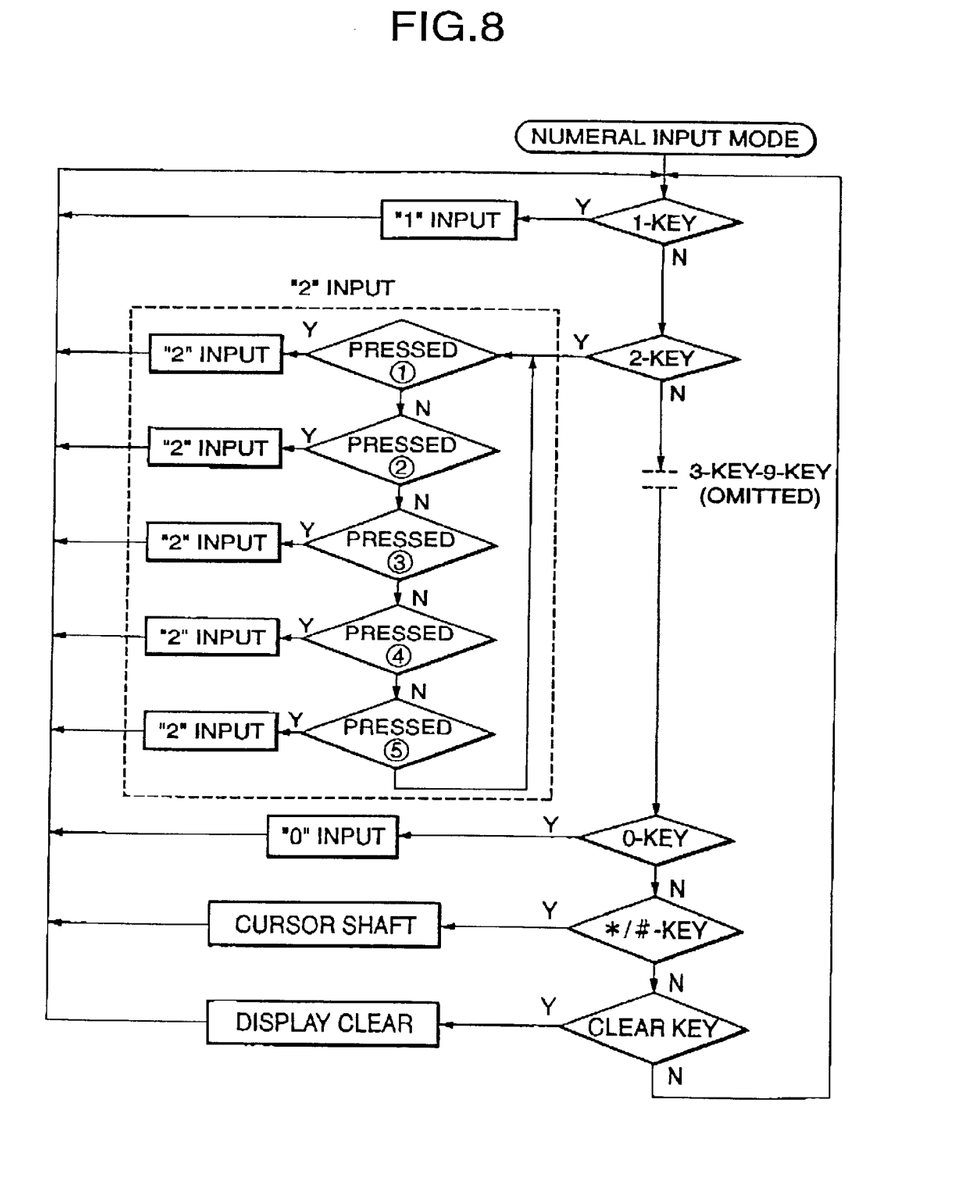
FIG. 8 is a flow chart showing a method for inputting characters in the numeric character input model and FIG. 9 is a plan view showing an external appearance of a portable phone.

As shown in FIG. 7, the numeral labeled on a ten-key is identical to that to be inputted regardless of the contacting position of the ten-key. Then, a desired numeral digit can be displayed and inputted by pressing the corresponding ten-key as shown in FIG. 8. Since the input operation for numeral character is substantially the same as that of Japanese and numerical character, the description is omitted.

Although the cases of the present invention provided in a certain condition have been explained in the above-mentioned embodiments, the present invention can be modified in various forms. For example, although the examples of allotting specific characters to specific ten keys have been explained in the above-mentioned embodiments, the characters to be allotted to each ten key is not limited to the examples as described above.

For example, although the example of inputting Katakana as the Japanese characters has been explained in the first embodiment, Hiragana can be inputted as the Japanese characters in the present invention.

Moreover, for example, although the certain time period for judging the number of contact points and the number of repetitions has been described as 0.2 second, the certain time period is not limited thereto, but a desired time period can be set in the present invention.

As described above, according to the present invention, each of keys of the ten-key pad has a plurality of contact points, at least one of which is selected depending on which position of the key is pressed, and a table for each of the kinds of characters contains correspondence between each position of the key and an individual character of a selected type of characters. Therefore, in principle, a targeted character can be selected and inputted easily by pressing the key top at a desired position thereof once. As a result, characters can be inputted rapidly without changing the characters conventionally allotted to the ten keys.

What is claimed is:

1. A portable telephone having a ten-key pad which allows input of a plurality of kinds of characters, comprising:

each of the keys of the ten-key pad having a plurality of contact points, each of the contact points having a corresponding position with respect to the key, at least one of the contact points being selected depending on which position of the key is pressed, another position of the key being determined by pressing all of the contact points simultaneously;

a table for each of the kinds of characters, the table containing correspondence between each position of the key and an individual character of a selected type of characters; and a controller controlling input of an individual character of the selected type of characters depending on a pressed position of the key by referring to the table, the controller determining an individual character of the selected type of characters depending on a combination of a pressed key of the ten-key pad and a pressing count of a pressed position of the pressed key.

2. The portable telephone according to claim 1, wherein each key of the ten-key pad has five positions, one of which is determined by pressing all the contact points of the key simultaneously.

3. The portable telephone according to claim 1, wherein when the pressed position is pressed once, a uppercase letter of the individual character is determined and, when the pressed position is pressed twice in a predetermined time period, a lower-case letter of the individual character is determined.

4. The portable telephone according to claim 1, wherein the kinds of characters are numeric, alphabetic, and Japanese characters.

5. A method for inputting a character to a portable telephone having a ten-key pad which allows input of a plurality of kinds of characters, the portable telephone including each of the keys of the ten-key pad having a plurality of contact points, each of the contact points having a corresponding position with respect to the key, at least one of the contact points being selected depending on which position of the key is pressed, another position of the key being determined by pressing all of the contact points simultaneously, comprising the steps of:

a) storing a table for each of the kinds of characters, the table containing correspondence between each position of the key and an individual character of a selected type of characters; and b) inputting an individual character of the selected type of characters depending on a pressed position of the key by referring to the table by
   determining which key is pressed;
   determining which position of a pressed key is pressed;
   determining how many times a pressed position of the pressed key is pressed within a predetermined time period; and
   inputting an individual character of the selected type of characters depending on a combination of the pressed key of the ten-key pad and a pressing count of the pressed position of the pressed key.

6. The method according to claim 5, wherein when the pressed position is pressed once, a uppercase letter of the individual character is inputted and, when the pressed position is pressed twice in a predetermined time period, a lower-case letter of the individual character is inputted.

7. The portable telephone according to claim 5, wherein the kinds of characters are numeric, alphabetic, and Japanese characters.

* * * * *